H. COOPER.
FLEXIBLE SHAFTING.
APPLICATION FILED MAY 10, 1915.
1,201,562. Patented Oct. 17, 1916.
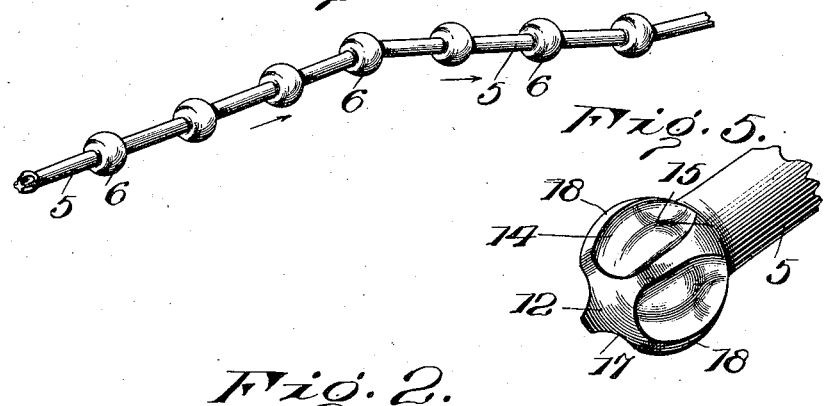
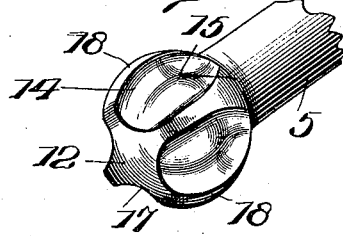
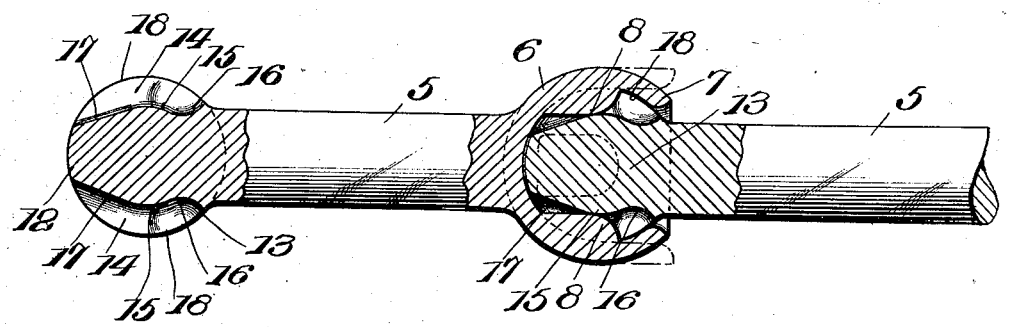
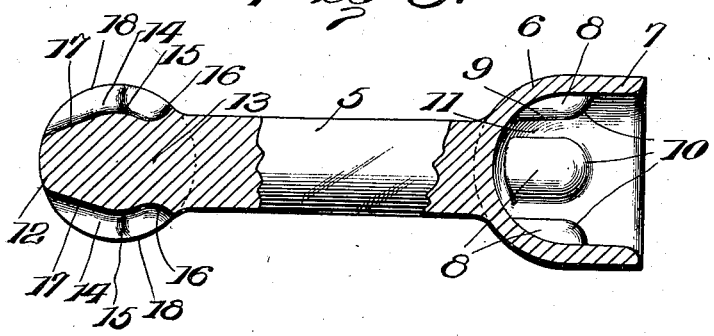
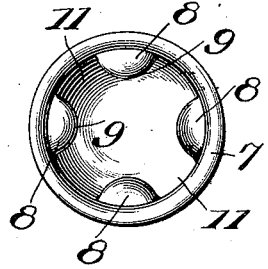
Witnesses
W. A. Williams
K. E. Klein
Inventor
Herbert Cooper
By Rennet Phelps
Attorneys

UNITED STATES PATENT OFFICE.

HERBERT COOPER, OF BROOKLYN, NEW YORK.

FLEXIBLE SHAFTING.

1,201,562.  Specification of Letters Patent.  Patented Oct. 17, 1916.

Application filed May 10, 1915.  Serial No. 27,113.

*To all whom it may concern:*

Be it known that I, HERBERT COOPER, a citizen of the United States, residing at Brooklyn, in the county of Kings and State of New York, have invented certain new and useful Improvements in Flexible Shafting, of which the following is a specification.

This invention relates to flexible shafting and more particularly to that class of such devices especially adapted for the efficient transmission of power.

The primary object of this invention is to construct a flexible shafting adapted to deliver power transmitted thereto in a direction from a straight line or in any angle with maximum efficiency and with minimum friction, wear or strain.

A further object is to provide a device of the character set forth which shall be simple of construction and comprise a mechanism adapted particularly to the uses of such devices.

A still further object of this invention is the provision of a shaft member embodying an improved unit for the construction of a flexible shafting possessing peculiar advantages.

With these and other objects in view as will hereinafter appear the invention consists in the peculiar arrangement and combination of the various related elements of a flexible shafting as further set forth and more particularly pointed out in the appended claim.

Referring to the drawings illustrating the preferred form of the device and in which similar reference characters are used to designate similar parts throughout, Figure 1 is a perspective view of a length of shafting constructed in accordance with the invention; Fig. 2 is a detail partly in section of two of the shaft members connected; Fig. 3 is a side view partly in section of one of the shaft members and Fig. 4 is an end view of the socket carried by the shaft member.

The numeral 5 designates a shank of suitable metal having an integral socket 6 formed with a lip 7. The interior of the socket has a series of equally spaced shoulders 8 having curved faces 9 and curved ends 10. These shoulders are separated by channels 11. The opposite end 12 of the shank 5 is a ball head 13 provided with a series of longitudinal grooves 14 having a central raised portion 15, a depression 16 and a gradually deepening portion 17. These grooves 14 are divided by longitudinally curved shoulders 18 of approximately the same width as the channels 11 of the socket 6.

The shaft members are assembled as follows: The head 13 of a shaft member is inserted within the socket 6 of another member, the shoulders 18 entering the channels 11. When in this position the integral shoulders 8 of the socket 6 engage the grooves 14 of the head 13, the said portions 15 of the grooves 14 engaging the curved faces 9 of the shoulders 8. The lip 7 is then burnished or swaged from the position shown in dotted lines to the position shown in full lines in Fig. 2, to conform to the curvature of the shoulders 18, thus holding the head within the socket and forming a universal joint.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claim.

Having thus described my invention what I claim as new and desire to secure by Letters Patent is:

In a flexible shafting, in combination, a plurality of similar shaft members, each having at one end an open ended socket having a plurality of internal substantially equidistant shoulders and intervening channels, and each member having at its opposite end a head adapted to fit an adjacent socket, said head having a plurality of longitudinally curved shoulders and grooves curved transversely adapted to have an interfitting and coactive relation with the channels and shoulders in said socket, the edges of said
5 socket being crimped over the inserted head to engage the shoulders and form a universal joint therewith.

In testimony whereof I affix my signature in presence of two witnesses.

HERBERT COOPER.

Witnesses:
  GORDON D. CAMPBELL,
  ARTHUR COOPER.